US009763192B1

(12) United States Patent
Vivanco et al.

(10) Patent No.: US 9,763,192 B1
(45) Date of Patent: Sep. 12, 2017

(54) SYSTEMS AND METHODS FOR ADJUSTING A SLEEP SCHEDULE OF A WIRELESS DEVICE IN A WIRELESS NETWORK

(71) Applicant: Sprint Spectrum LP, Overland Park, KS (US)

(72) Inventors: Daniel Vivanco, Sterling, VA (US); Diego Estrella Chavez, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/508,203

(22) Filed: Oct. 7, 2014

(51) Int. Cl.
  *H04W 52/02* (2009.01)
  *H04W 36/00* (2009.01)
  *H04W 36/02* (2009.01)
(52) U.S. Cl.
  CPC ... *H04W 52/0251* (2013.01); *H04W 36/0083* (2013.01); *H04W 36/023* (2013.01)
(58) Field of Classification Search
  None
  See application file for complete search history.

(56) References Cited

U.S. PATENT DOCUMENTS

| 7,966,017 | B2* | 6/2011 | Kim et al. | 455/436 |
| 2008/0090573 | A1* | 4/2008 | Kim et al. | 455/436 |
| 2010/0128645 | A1* | 5/2010 | Lin et al. | 370/311 |
| 2011/0044285 | A1* | 2/2011 | Jang et al. | 370/331 |
| 2011/0136530 | A1* | 6/2011 | Deshpande | 455/515 |
| 2012/0015657 | A1* | 1/2012 | Comsa et al. | 455/436 |
| 2012/0021747 | A1* | 1/2012 | Brandt | H04W 36/0055 455/437 |
| 2012/0176950 | A1 | 7/2012 | Zhang et al. | |
| 2014/0226570 | A1* | 8/2014 | Comeau | H04W 72/042 370/329 |

FOREIGN PATENT DOCUMENTS

| WO | 2013114155 A1 | 8/2013 |
| WO | 2013147665 A1 | 10/2013 |

* cited by examiner

*Primary Examiner* — Omar Ghowrwal
*Assistant Examiner* — Angel Brockman
(74) *Attorney, Agent, or Firm* — Jones Robb, PLLC

(57) ABSTRACT

Systems and methods are described for adjusting a sleep schedule of a wireless device in a wireless network. A mobility of a wireless device may be determined to exceed a threshold mobility. The wireless device may be operating in a sleep mode with a discontinuous reception schedule having listening intervals separated by sleep periods. A source access node may request to handover the wireless device to a target access node and may provide information to the target access node regarding the determined mobility and the determined sleep mode before handover completion. The target access node may then initiate wireless communication with the wireless device during a listening interval previously scheduled by the source access node. After the initial communication with the target access node, the wireless device may resume the previously determined sleep mode in order to optimize power use of the wireless device.

16 Claims, 8 Drawing Sheets

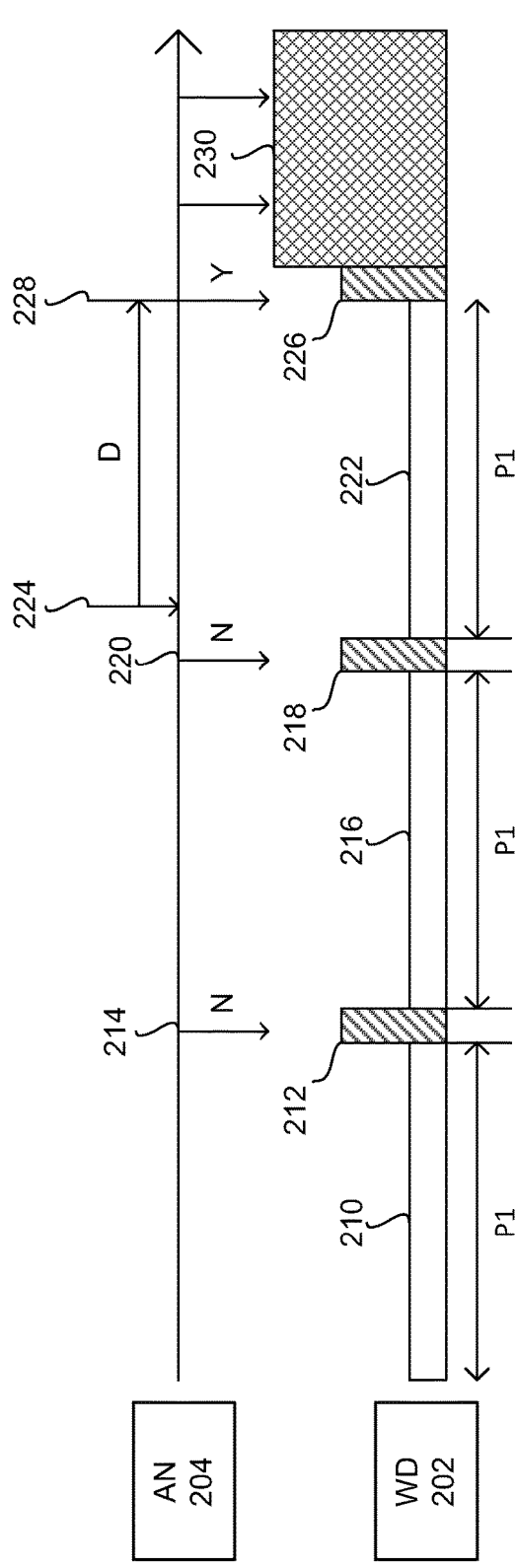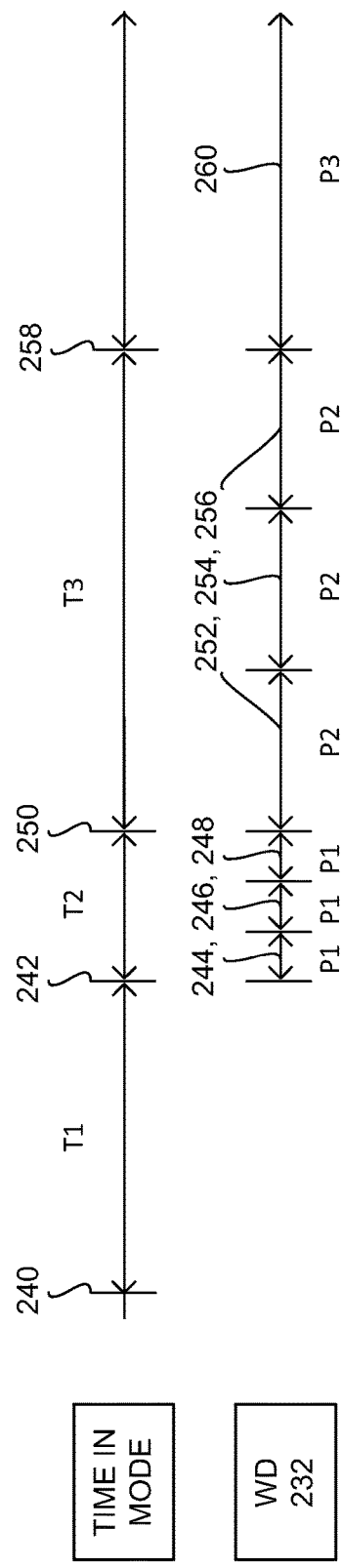

US 9,763,192 B1

SYSTEMS AND METHODS FOR ADJUSTING A SLEEP SCHEDULE OF A WIRELESS DEVICE IN A WIRELESS NETWORK

TECHNICAL BACKGROUND

Various power saving mechanisms may specify periods of time in which a wireless device may go into a sleep mode and power off its reception unit to save power. After each sleep period, the wireless device may restart or "wake up" the reception unit and reestablish wireless communication with a serving access node for a specific duration. During such a "listening interval," the restarted reception unit of the wireless device may check for packet arrival from the serving access node and determine whether the wireless device should go back into the sleep mode or transition into an active mode.

If no data packets have arrived during the listening interval, the wireless device may go back to sleep to conserve power. However, if data packets are received at the wireless device, then the wireless device may transition to the active mode. There is a tradeoff between power savings during a sleep period and a potential delay in receiving data packets transmitted during the sleep periods. It may be desirable to have multiple sleep modes, in addition to active and idle modes at either end of the spectrum. In order to optimize power savings, a wireless device may enter deeper modes of sleep after reaching threshold times of inactivity. The listening intervals may be spaced apart by longer sleep periods at deeper sleep modes. This may help prevent more recently active wireless devices from experiencing longer delays than necessary before awaking to receive packets. Upon handover, an access node may force a wireless device into an active mode in order to establish status and transmit control signals.

OVERVIEW

Systems and methods are described for adjusting a sleep schedule of a wireless device in a wireless network. It may be determined that the wireless device is highly mobile, which is to say that the wireless device has a mobility above a threshold mobility. In addition to being highly mobile, the wireless device may also be determined to be in a first sleep mode. The wireless device may have entered a sleep mode after a period of inactivity as a power saving mechanism. In a first sleep mode, power savings may be achieved by receiving data at the wireless device according to a first discontinuous reception schedule with reception intervals at which intended data is received. When the wireless device is ready for handover to a target access node, a source access node may provide information regarding the determined mobility and the determined first sleep mode during the handover process.

The target access node may initiate wireless communication with the wireless device during a scheduled reception interval of the first discontinuous reception schedule. Based on the information regarding the mobility and first sleep mode received from the source access node, the target access node may resume further communication with the wireless device using the first sleep mode according to a second discontinuous sleep schedule.

BRIEF DESCRIPTION OF THE DRAWINGS

FIG. 2A illustrates a wireless device transitioning from a sleep mode to an active mode according to an exemplary embodiment of the present disclosure.

FIG. 2B illustrates a wireless device transitioning from an active mode through multiple sleep modes and into an idle mode according to an exemplary embodiment of the present disclosure.

DETAILED DESCRIPTION

Figure 1:
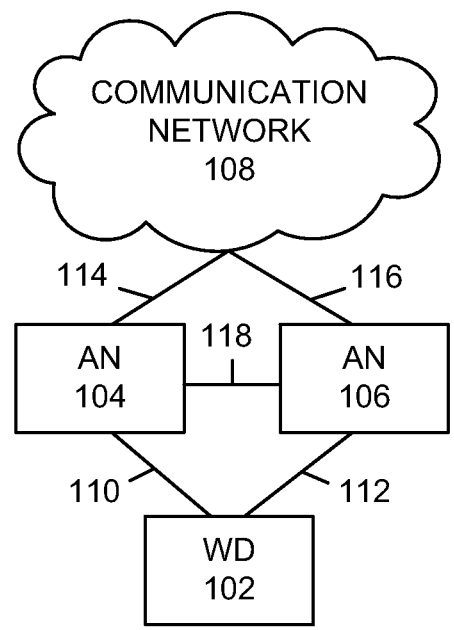
FIG. 1 illustrates an exemplary communication system used to adjust a sleep schedule of a wireless device in a wireless network.

FIG. 1 illustrates an exemplary communication system 100 to allocate resources in a wireless network comprising wireless device 102, access nodes 104 and 106, communication network 108, and communication links 110, 112, 114, and 116. Each of the access nodes may have a plurality of cells in one or more frequency bands. The cells of access node 104 may be associated with a different frequency band than the cells of access node 106.

Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and may be, for example, a base transceiver station, a radio base station, a NodeB device, or an eNodeB device. Access nodes 104 and 106 may communicate with communication network 108 over communication links 114 and 116. Access nodes 104 and 106 may also communicate directly with each other over communication link 118. In an embodiment, access node 104 may comprise a serving access node for wireless device 102.

Although only two access nodes 104 and 106 are illustrated in FIG. 1, wireless device 102 can be in communication with additional access nodes. The plurality of access nodes may be associated with different networks and may support different communication protocols and radio access technologies.

Communication network 108 may comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or other types of communication equipment, as well as combinations thereof.

Communication links 110, 112, 114, 116, and 118 may be wired or wireless communication links. Wired communication links may comprise, for example, twisted pair cable, coaxial cable, or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, WiMAX, or 3GPP LTE, or combinations thereof. Other wireless protocols can also be used.

FIG. 2A is a schematic illustration of a wireless device 202 transitioning from a sleep mode to an active mode according to an exemplary embodiment of the present disclosure. In this example, the wireless device 202 may communicate with a serving access node 204 according to a sleep schedule in which sleep windows 210, 216, and 222 separate reception or listening intervals 212, 218, and 226 in which the wireless device 202 may turn its reception unit back on to check for an indication of packets transmitted by the access node 204. In the exemplary embodiment, the sleep windows may have length P1 according to a first sleep mode, although awakening process would be similar for additional sleep modes. The first two indications 214 and 220 in FIG. 2A are negative, meaning that no packets were received at the access node 204 intended for the wireless device 202. Upon receiving the negative indications 214 and 220, the wireless device returns to the sleep mode as illustrated at 216 and 222.

In the third instance, a packet 224 arrived at the access node 204 intended for the wireless device 202. The wireless device 202 receives the positive indication at 228 regarding transmission of the intended data packet(s) and transitions into an active mode in anticipate of additional transmissions. It is noted that a transmission delay D may occur between 224 and 228 that depends on the relative length of sleep windows (e.g. 222) and the relative timing of an intended data packet 224 at the access node 204. It may be desirable to implement a power saving mechanism that balances power savings from discontinuous reception with the potential drawbacks such as delayed transmission.

FIG. 2B illustrates a wireless device transitioning from an active mode through two sleep modes and into an idle mode according to an exemplary embodiment of the present disclosure. The specific number of sleep modes is not limited by the present disclosure, and any number of suitable sleep modes may be configured according to preferences selected by a wireless device manufacturer/user and/or a network operator.

In the exemplary embodiment of FIG. 2B, a wireless device 232 may go from being active to inactive at 240, and may be inactive for T1 seconds, which may be a threshold amount of time for the wireless device to be inactive before transitioning into a first sleep mode at 242. In the first sleep mode, the wireless device 232 may have sleep periods 244, 246, and 248 of length P1 followed by listening intervals as previously disclosed at elements 212, 218, and 226 in the exemplary embodiment of FIG. 2A.

In an exemplary embodiment, the length of the listening intervals 212, 218, and 226 may be considered significantly smaller than the length of the sleep periods in order to obtain power saving benefits of the discontinuous reception schedule. The exemplary embodiment of FIG. 2B depicts 3 sleep periods 244, 246, and 248 of length P1 being equal to a length of time T2, however a number of sleep periods is not limited by this disclosure and may comprise any number of sleep periods according to configured network preferences for length of sleep periods and threshold operating mode timers.

In the exemplary embodiment of FIG. 2B, it is assumed that, in the listening intervals following each of the sleep periods 244, 246, and 248, no data packets arrive at the serving access node intended for the wireless device 232. As time continues without receiving data packets intended for the wireless device 232, a timer may count a total amount of time that the wireless device 232 has been in the first sleep mode and compare it against a first sleep operating mode threshold timer. The length of time T2 shown in FIG. 2B may be a threshold amount of time for the wireless device to be inactive within the first sleep operating mode before transitioning into a second sleep mode at 250.

Listening intervals may save power by not fully waking a wireless device. Deeper sleep modes may increase power savings at least by increasing an amount of time between listening intervals. That is, sleep periods 252, 254, and 256 in the second sleep mode may have length P2, where P2>P1. The exemplary embodiment depicts 3 sleep periods of length P2 being equal to a length of time T3, but a number of sleep periods is not limited and may comprise any number of sleep periods according to configured network preferences for length of sleep periods and threshold operating mode timers.

In the exemplary embodiment of FIG. 2B, it is assumed that, in the listening intervals following each of the sleep periods 252, 254, and 256, no data packets arrive at the serving access node intended for the wireless device 232. As before, another timer may count a total amount of time that the wireless device 232 has been in the second sleep mode and compare it against a second sleep period threshold time. The length of time T3 shown in FIG. 2B may be a threshold amount of time for the wireless device 232 to be inactive within the second sleep period before transitioning into an idle mode at 258. However, as noted above, it is within the scope of the disclosed subject matter to have additional sleep modes before transitioning to the lowest power use state, which may be referred to as an idle mode. The wireless device 232 may remain in the idle state 260 until otherwise instructed, or may monitor a paging channel for incoming calls or other notifications that may wake the wireless device 232 from idle mode 260.

The timers between the wireless device 232 becoming inactive at 240, entering first sleep mode at 242, entering second sleep mode at 250, and entering idle mode at 258 may be measured by the wireless device 232, by the serving access node, or by an additional network node to which the serving access node is in communication. Further, the serving access node may provide instructions at 242, 250, and 258 so that the wireless device 232 is aware of the operating mode and schedule of sleep periods 244, 246, 248, 252, 254, and 256.

The present disclosure further relates to an operation of system 100 having the wireless device 102 and access nodes 104 and 106. In operation, wireless device 102 may establish communication with one or both of access nodes 104 and 106, such that access nodes 104 and 106 may be able to transmit wireless signals to wireless device 102. In an embodiment, communication system 100 may be configured to manage access node neighbor relations.

When wireless devices such as wireless device 102 are highly mobile, they may experience a high number of handovers or handover requests. If a wireless device is forced to return to an active mode after each handover, it may be more difficult to implement power saving mechanisms, because the wireless device must then satisfy all thresholds of each active and shorter sleep mode before moving into longer sleep modes. This increases an amount of power that must be used, at least because the wireless device may be forced to receive additional signals and to have shorter sleep periods before awakening at each listening interval.

Mobility of wireless device 102 may be determined by a number of factors, and various indicators of mobility may be handovers requested or performed. Wireless devices that have experienced a number of handover requests or actual handovers above thresholds over a period of time may be determined to be highly mobile.

Source access nodes such as access node 104 may further determine an operating mode for each wireless device that is determined to be highly mobile. It may be desirable to transmit this mobility information and relevant information on the operating mode and any related inactivity timers to target access nodes such as access node 106 using communication link 118, which may comprise an X2 link.

The transmitted information may allow wireless device 102 to return to whatever mode it was in while connected to source access node 104 before handover and/or to continue counting time toward a threshold amount of time for transitioning to an operating mode that uses less power while connected to target access node 106. The present disclosure may further minimize control signals between wireless devices and target access nodes such as access node 106 by scheduling the control signals for listening intervals already scheduled for the wireless devices by source access nodes.

Note that, during X2 messaging between the source access node and the target access node, the source access node may only have knowledge of the actual timer prior to handover, but cannot always precisely predict how long it will take to complete performance of the handover. Thus, it may be desirable to estimate the handover timer based on previous handover events between the same source access node and target access node. This information may be stored in a neighbor relations table and may be readjusted at periodic intervals to provide an accurate estimation of handover time.

Figure 3:
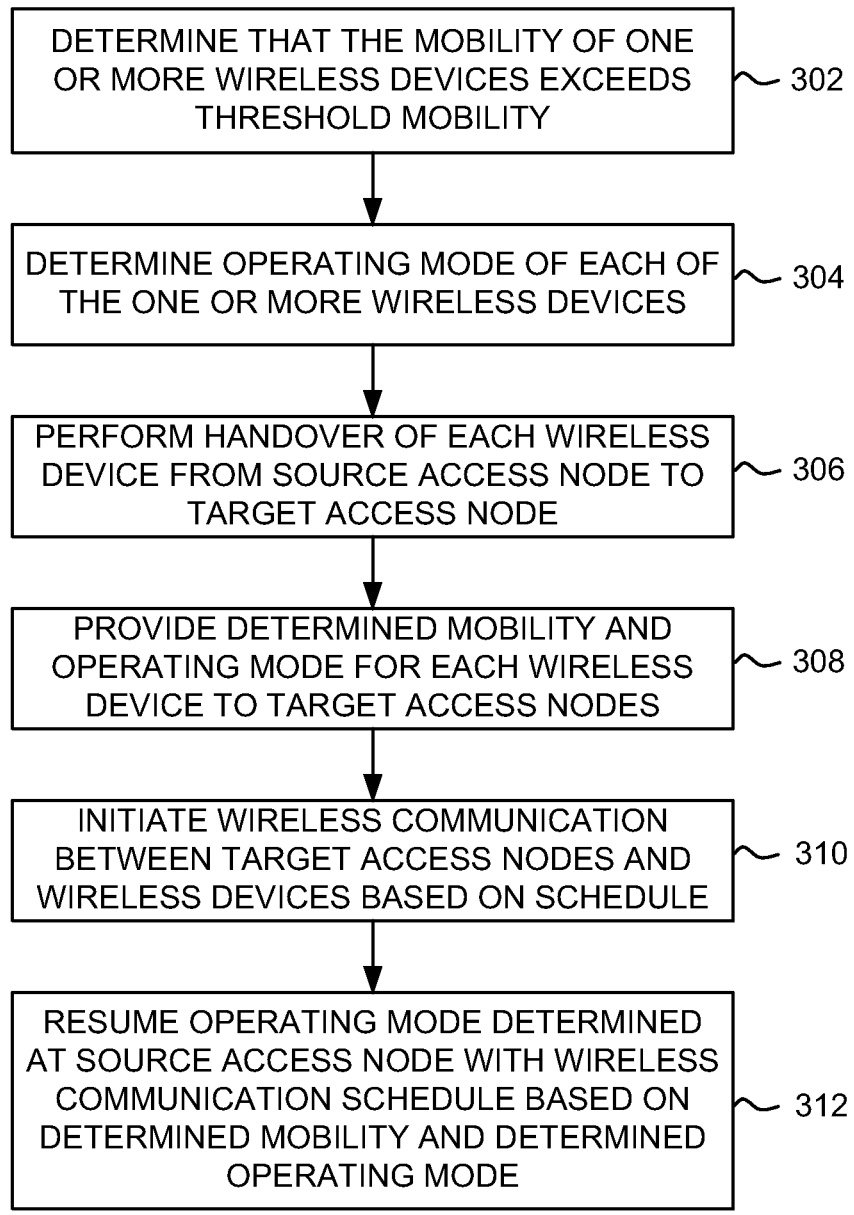
FIG. 3 illustrates an exemplary method of adjusting a sleep schedule of a wireless device in a wireless network.

FIG. 3 illustrates an exemplary method for adjusting a sleep schedule of a wireless device in a wireless network. The method will be discussed with reference to the exemplary communication system 100 illustrated in FIG. 1. However, the method may also be implemented with any other suitable communication system.

It may be desirable to determine that highly mobile wireless devices are in a sleep mode so that they may be able to maintain the determined operating mode (e.g. active, sleep, idle). Returning to the same sleep mode that the wireless device was in prior to handover to a target access node may converse power use by the wireless device because by not having to reset to an active mode after every handover. However, there may be tradeoffs between moving quickly into sleep or idle modes and receiving packets in a timely manner, as discussed in further detail with regard to the schematic illustrations of FIGS. 2A and 2B.

It may be desirable to minimize wireless communication with the wireless device during handover such that it has as little impact on power use as possible. In this regard, control signals establishing a communication schedule may be transmitted from the target access node to a wireless device at a time that was previously scheduled for the wireless device to listen for packets transmitted by the source access node. The control signals may establish a new discontinuous reception schedule that continues the operating mode the wireless device was in prior to handover. In this way, it may be possible to achieve power savings for highly mobile wireless devices while providing an improved way to establish a new power saving discontinuous reception schedule at a source access node. Various elements of an exemplary method will be discussed in detail below.

Application requirements may comprise a quality of service, a type of service, anticipated frequency of communication or another suitable metric of anticipated network resource demands of a desired application. In an exemplary embodiment, application requirements may comprise a type or frequency of service, and may indicate a typical transmission schedule, which for example may be measured in terms of overall data, data rate, peak data rate during bursts, and transmission burstiness or persistence. If a wireless device was recently using a service that is persistent (such as voice), this may be an indication that the wireless device should wait longer before moving into a deeper sleep mode, as it may be more likely that the wireless device will be active soon. However, if a wireless device was only sending isolated bursts of data traffic, such as for surfing the internet, sending email, or playing a game, it may be desirable to drop into a deeper sleep mode as soon as possible in order to optimize power savings.

Referring to FIG. 3, at step 302, a source access node such as access node 104 may serve wireless device 102, and may determine the mobility of wireless device 102. The determined mobility may be compared against a mobility threshold, which may be configured by a network operator in an exemplary embodiment based on access node density. When the determined mobility exceeds the configured mobility threshold for the wireless device 102, it may be desirable to adjust a reception schedule of that wireless device after handover to a target access node such as access node 106 so that if the wireless device 102 was in a sleep or idle mode at a source access node 104, it will return to the same sleep or idle mode at the target access node 106.

At step 304, an operating mode may be determined for the wireless device 102 having a determined mobility exceeding the configured mobility threshold. In one exemplary embodiment, the operating mode may be an active mode, one of a plurality of sleep modes, or an idle mode. The present disclosure occasionally refers to two basic sleep modes, namely "Short Sleep" and "Long Sleep," however any number of sleep modes may be used in order to add further flexibility in sleep schedules and corresponding power savings. When the wireless device 102 is determined to be in a sleep or idle mode, it may be desirable to transmit this information to the target access node 106 to establish an appropriate reception schedule to resume the operating mode.

Each of the sleep modes and the idle mode may be associated with various discontinuous reception schedules. By communicating at specific intervals separated by sleep or idle periods, it may be possible to optimize power savings of wireless devices. The length of each sleep period may be determined based on the type of mode. While in sleep modes, a wireless device 102 may continue to monitor a control signal of an access node, which in an exemplary embodiment may be a Physical Downlink Control Channel (PDCCH). However, in an idle mode, a wireless device 102 may check only for a signal that may be transmitted in an exemplary embodiment over a paging channel. In this way, even a wireless device 102 that is operating in an idle mode may be awakened for sufficiently important packets. Listening intervals in idle mode may be located between longer periods than the sleep periods used for any of the sleep modes.

At step 306, performance of a handover process may begin from a source access node such as 104 to target access node such as 106 for a wireless device 102 which was determined to have a mobility above the threshold and to be in a sleep or idle mode. The handover process may use signal measurement reports and any other network information obtained through ANR or similar network organizing protocol in order to communicate network information to facilitate the handover process. Appropriate target access nodes for handover may be selected at least based on relative signal strengths.

At step 308, the source access node 104 the wireless device selected for handover may provide information regarding the determined mobility and the determined operating mode of the wireless device 102 to the target access node 106 selected for handover of that wireless device. As noted above, examples of the operating mode may include active, sleep, or idle. Even if the wireless device 102 is not currently in a sleep or idle mode at the time of handover, it may be desirable to provide information regarding the active operating mode so that upon reaching an inactivity threshold, the wireless device may 102 be transitioned into a discontinuous reception mode as soon as possible.

At step 310, wireless communication between the target access node 106 and the wireless device 102 may be initiated during a listening interval of a discontinuous reception schedule set up by the source access node 104.

At step 312, the target access node may resume wireless communication with the wireless device 102 using the same operating mode previously determined by the source access node 104. In the example where the operating mode is a sleep mode, or other mode having a discontinuous reception schedule as discussed above, the target access node 106 will attempt to communicate wirelessly with the wireless device 102 using a similar sleep schedule with listening intervals scheduled between sleep periods having a length determined by the specific type of operating mode. That is, after briefly waking up the wireless device 102 to transmit control signals regarding the handover, the target access node 106 may instruct the wireless device 102 to return to its previous operating mode and/or transition the wireless device to a further sleep or idle mode more quickly based on at least an amount of time the wireless device 102 has been inactive in the operating mode.

Figure 4:
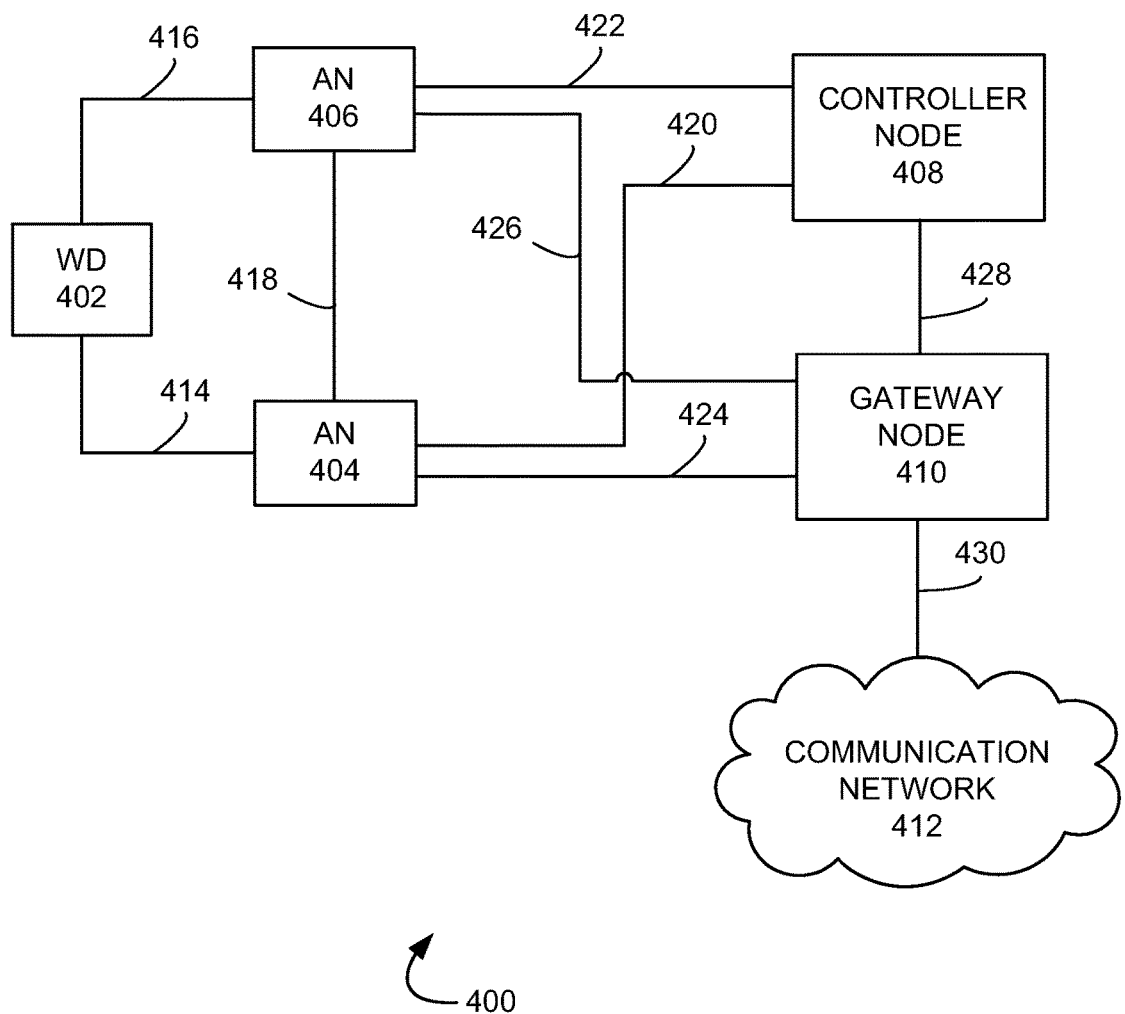
FIG. 4 illustrates another exemplary system used to adjust a sleep schedule of a wireless device in a wireless network.

FIG. 4 illustrates another exemplary communication system 400 to determine a communication access node for a wireless device. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, a NodeB device, or an enhanced NodeB (eNodeB or eNB) device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and combinations thereof. In an embodiment, controller node 408 may perform portions of the steps illustrated in the methods of FIGS. 3 and 5.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and combinations thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet).

Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
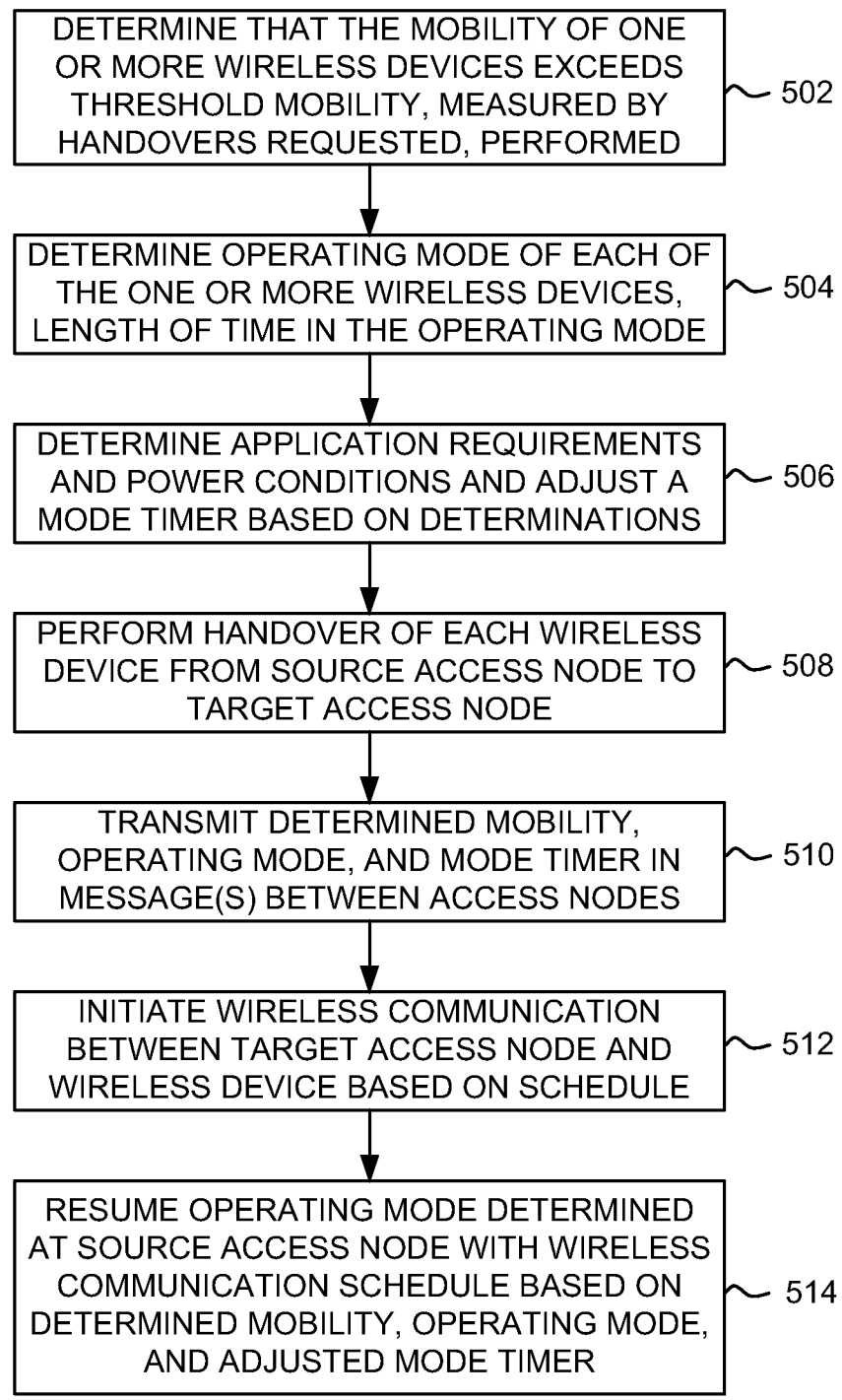
FIG. 5 illustrates another exemplary method of adjusting a sleep schedule of a wireless device in a wireless network.

FIG. 5 illustrates an exemplary method for adjusting a sleep schedule of a wireless device in a wireless network. The method will be discussed with reference to the exemplary communication system 400 illustrated in FIG. 4, however, the method can be implemented with any suitable communication system.

Referring to FIG. 5, at step 502, a source access node 404 is serving a wireless device 402, and the source access node 404 may determine the mobility of the wireless device. The determined mobility may be compared against a mobility threshold, which may be set by a network operator or configured in an exemplary embodiment based on access node density. When the determined mobility exceeds the configured mobility threshold for the wireless device 402, it may be desirable to adjust a reception schedule of that wireless device 402 in order to optimize power savings by returning to a low power use operating mode. In an exemplary embodiment, the mobility and the threshold mobility may be determined by handovers requested or performed over a period of time. Factors including wireless device signal measurement reports may also be used.

At step 504, an operating mode for the wireless device 402 may be determined, and a timer representing an amount of time that the wireless device 402 has been in the operating mode may also be determined. Even if the wireless device 402 is determined to be in an active mode, it may be desirable for the source access node 404 to determine the amount of time the wireless device 402 has been inactive in order to transition the wireless device 402 into a sleep mode at the earliest possible opportunity after a handover, for example to target access node 406.

At step 506, application requirements and power conditions of the wireless device 402 may be determined. The application requirements may be related to one or more applications used by the wireless device 402 during the previous active mode. The application requirements may indicate any suitable measure regarding ability of the applications to tolerate delayed packet transmission. In an exemplary embodiment, the application requirements may indicate an application type. The power conditions may indicate battery level or whether the wireless device 402 is connected to auxiliary power.

The timer of step 504 may be adjusted by an adjustment factor based on the determined application requirements and the determined power conditions of the wireless device 402 prior to handover. A longer timer will reach a threshold time sooner, so application requirements indicating a type of service with lower tolerance to delay may have a higher adjustment factor subtracted from the timer so that it will take longer to transition into a sleep or idle mode, depending on the previous operating mode of the wireless device. However, application requirements indicating that an application is able to tolerate long delays may have little or no adjustment factor, preferring power savings.

Further adjustment may be made based on the determined power conditions. If the battery is above a threshold level or the wireless device 402 is plugged in, the adjustment factor may be higher than if the battery is below a threshold level and the wireless device 402 does not have an auxiliary source of power.

At step 508, performance of a handover process may begin from a source access node 404 to target access node 406 for a wireless device 402 determined to have a mobility above the threshold and to be in a sleep or idle mode. The handover process may use signal measurement reports and other network information obtained through an ANR or similar network organizing protocol in order to communicate information about all access nodes (e.g. 404 and 406, but not limited in number) and network nodes such as controller nodes (e.g. 408) and gateway nodes (e.g. 410) that assist the handover process. Appropriate target access nodes such as target access node 406 may be selected for handover at least based on relative signal strength, as well as other relevant criteria.

At step 510, the determined mobility, operating mode, and timer may be transmitted between the source access node 404 and the target access node 406. In an exemplary embodiment, the transmission may occur in a single message over a direct link between the access nodes, such as an X2 connection. In FIG. 4, this direct link is shown at communication link 418. The message may simultaneously transmit a request to handover along with an indication that the device for which handover is requested has mobility above a threshold, an operating mode that is a sleep mode or other similar discontinuous reception mode, and an adjusted timer representing time in current mode before handover minus an adjustment factor based on application requirements and power conditions. The transmission of handover information between source access node 404 and target access node 406 may also comprise multiple messages or responses.

At step 512, the target access node 406 may initiate wireless communication with the wireless device 402 over a PDCCH during a listening interval of a discontinuous reception schedule previously scheduled by the source access node 404. The wireless device 402 may remain active for long enough to receive the control signals instructing the wireless device 402 regarding a second discontinuous reception schedule.

The second discontinuous reception schedule may have sleep periods and listening intervals of the same or similar lengths as the first discontinuous reception schedule. However, in an exemplary embodiment, the second discontinuous reception schedule may be adjusted based on the adjusted timer. If the adjustment factor is large, then the second discontinuous reception schedule may plan for additional iterations of the current sleep period and listening interval lengths to compensate for the increased gap between the adjusted timer and the threshold time for moving to the next sleep/idle mode.

At step 514, wireless communication between the wireless device 402 and the target access node 406 may resume using the operating mode which was previously determined at the source access node 404. The control signals communicated to the wireless device 402 by the target access node 406 during the brief active period allow the target access node to transmit instructions regarding the communication schedule. As noted above, the communication schedule at the target access node 406 may be based on the determined mobility, the operating mode, and the adjusted timer.

Figure 6:
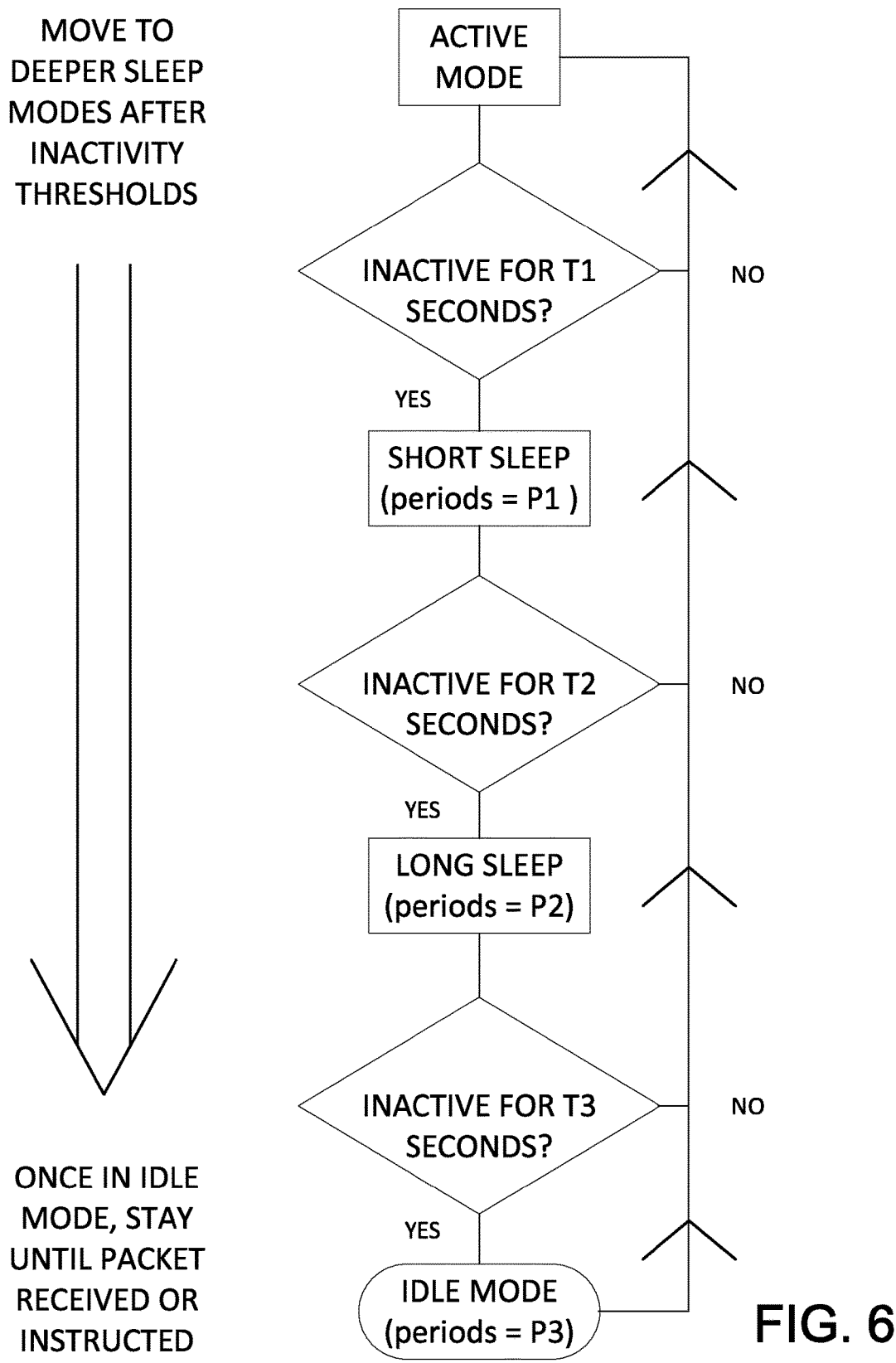
FIG. 6 illustrates an exemplary flowchart of decisions for moving between various active, sleep, and idle modes according to embodiments of the present disclosure.

FIG. 6 illustrates an exemplary flowchart of decisions for moving between various active, sleep, and idle modes according to embodiments of the present disclosure. In an exemplary embodiment, a wireless device may begin at any access node in the network in an active mode before being inactive for an active mode inactivity threshold, at which point the wireless device may drop into a short sleep mode, followed by at least one subsequent inactivity threshold to drop into a long sleep mode or an idle mode. When an adjusted timer reaches an inactivity threshold at whichever access node is currently serving the wireless device, that access node may instruct the wireless device to drop into the next deeper sleep mode or idle mode.

As with the schematic illustration of FIG. 2B, the inactivity threshold for the active mode may be T1 seconds and the short sleep periods may be P1 seconds. Similarly, an inactivity threshold for the short sleep mode may be T2 seconds and the long sleep periods may be P2 seconds. In an exemplary embodiment, T2 may be greater than T1 and P2 may be greater than P1. However, it is within the scope of the disclosure to have either T1 or P1 equal to or greater than T2 or P2, respectively. In a practical sense, a deeper sleep mode may be achieved by having longer sleep periods, and it may be desirable to have a time threshold be smaller if there are additional sleep modes with further incrementing of sleep period lengths.

Once a wireless device achieves an idle mode, it may attempt to stay in that mode in order to conserve as much power as possible, as this is the lowest power use mode other than being completely powered off. In the idle mode, a wireless device may monitor a paging channel to receive incoming calls, but otherwise may not be connected to an access node. However, it may be possible to resume idle mode after a handover.

Figure 7:
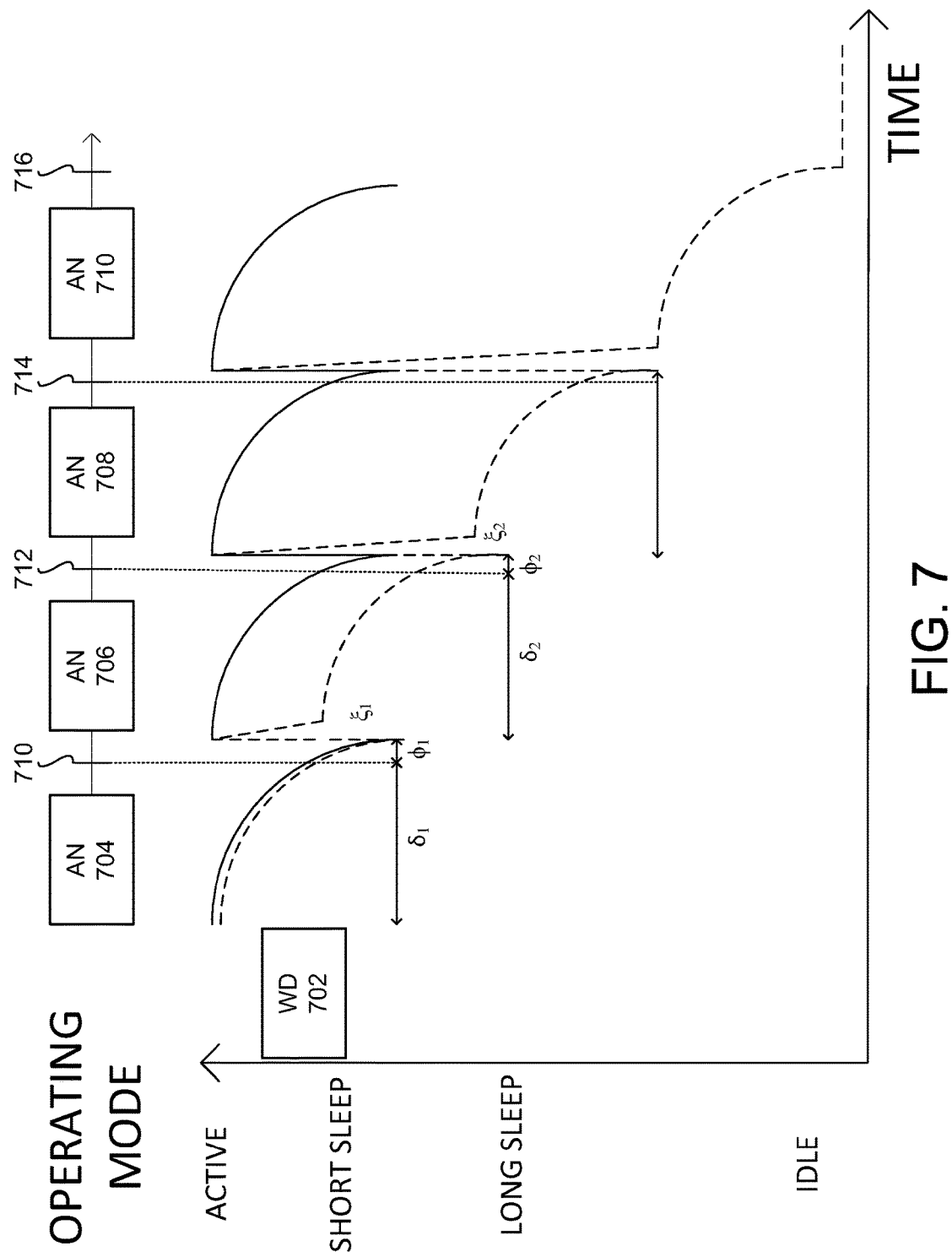
FIG. 7 illustrates an exemplary comparison between a conventional return to active mode upon handover and an exemplary illustration of a method where a wireless device resumes a sleep or idle mode after handover.

FIG. 7 illustrates an exemplary comparison between an embodiment of the disclosed subject matter (dashed lines) and a conventional method (solid lines) where a wireless device is returned to an active mode after each handover. Furthermore, in the conventional method, a source access node does not transmit a timer related to an amount of time that the wireless device has been in a particular mode or otherwise inactive. This may force a wireless device to return to the active mode for a full inactivity threshold period of time before being allowed to transition into a sleep mode.

The dashed lines of the disclosed subject matter and the solid lines of the conventional method correspond to mode achieved, which is directly related to power use patterns of a wireless device in that mode. The disclosed subject matter represented by the dashed lines achieves the deeper sleep modes with significantly less power use than the conventional method by sending from a source access node to a target access node one or more messages. The one or more messages transmitted between the source access node and the target access node may comprise an adjusted timer, the adjusted timer being equal to a time that the wireless device has been in its current mode prior to handover plus a time estimated to complete the handover, minus an adjustment factor based on application requirements and power conditions of the wireless device.

In FIG. 7, the current operating mode timer at access node 704 is referred to as $\delta_1$ and the estimated handover time for handover to access node 706 is referred to as $\phi_1$. The adjustment factor is referred to as $\xi_1$. As illustrated by the first dashed line and the first solid line below the access node 704, a wireless device 702 may enter a sleep mode such as a short sleep mode. The amount of time (e.g. $\delta_1$) the wireless device 702 is in the operating mode prior to a handover request (e.g. 710) plus an amount of time to perform the handover (e.g. $\phi_1$) would put the wireless device 702 further toward a deeper sleep mode such as the exemplary long sleep mode. However, it may be desirable to include the adjustment factor (e.g. $\xi_1$) in order to allow the wireless device 702 to resume earlier stage of the same operating mode after handover to the access node 706.

In the second dashed line after handover to the access node 706, a new timer begins for amount of time in the operating mode based on the factors determined at the access node 704. At the time of the next handover, the new operating mode timer plus estimated handover timer may be referred to as $\delta_2+\phi_2$ before subtraction of the adjustment factor $\xi_2$ to provide a starting point for an operating mode timer to begin after handover to access node 708. Successive timers may be measured and adjusted for the access node 708 and further access nodes such as access node 710.

An operating mode timer may also be reset if and when the wireless device 702 transitions into a deeper sleep mode. Furthermore, if an operating timer plus a handover timer would be equal to or greater than a threshold for transitioning the wireless device 702 to the deeper sleep mode, then the target access node may instruct the wireless device 702 to communicate using the deeper sleep mode.

Adjusted timer information including the operating mode timer, handover timer, and adjustment factor may be transmitted from a source access node to a target access node during a handover request 710, 712, 714, 716 so that during the next listening interval for the wireless device 702, the target access node may communicate with the wireless device 702 to provide instructions regarding the adjusted timer and the current operating mode for the wireless device 702. The brief return to an active mode which may be used to transmit and receive control signals between the wireless device 702 and a target access node such as access nodes 706 and 708.

When the wireless device 702 receives instructions from the target access node, it may communicate according to the schedule transmitted during the brief active period following the listening interval. The communication schedule is provided based on the adjusted timer. While the adjustment factor discussed above may restrict power savings, this may be balanced against resume an operating mode with an optimal chance of achieving the next deeper sleep mode before being woken up again. The target access node may instruct the wireless device 702 to resume a sleep schedule of a particular mode as quickly as possible once the wireless device enters active mode, as shown by the dashed lines from access nodes 706, 708, and 710 returning immediately to a previous operating mode of the wireless device 702.

Instructing the wireless device 702 to resume the sleep schedule may be done by sending an updated connection configuration message by the target access node, which may be a RRC CONNECTION RECONFIGURATION message in an exemplary embodiment where the wireless device receives the message during a listening interval previously scheduled by the source access node. The connection configuration message may overwrite the previous number of scheduled sleep periods with an adjusted number determined by the operating mode timer, the handover timer, and the adjustment factor based on application requirements and power conditions. It may be desirable to control the target access node in a way that prompts it to instruct the wireless device regarding the updated RRC CONNECTION RECONFIGURATION in a single message to the wireless device 702 during the handover process.

After the wireless device 702 achieves deeper levels of sleep, it may be desirable to reduce the impact of or to omit entirely the adjustment factor, as shown in the handovers from access nodes 706 to access node 708, and from access node 708 to access node 710 in FIG. 7. The adjustment factor may still be used, but may be given less weight, as wireless devices in "deeper" sleep modes typically have not been active in a longer time than wireless devices in "lighter" sleep modes. As such, adjustment factor $\xi_2$ may be smaller than adjustment factor $\xi_1$, and the adjustment factor may be eliminated entirely for subsequent handovers based on a threshold timer or a type of operating mode achieved (e.g. predetermined type of sleep or idle mode).

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 8:
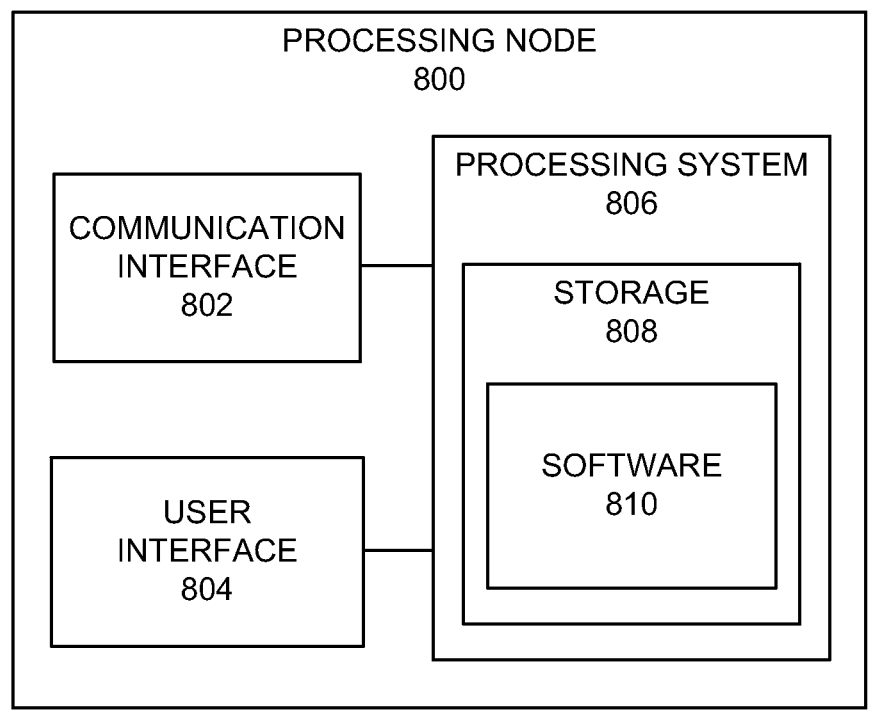
FIG. 8 illustrates an exemplary processing node.

FIG. 8 illustrates an exemplary processing node 800 in a communication system. Processing node 800 comprises communication interface 802, user interface 804, and processing system 806 in communication with communication interface 802 and user interface 804. Processing node 800 can be configured to determine a communication access node for a wireless device. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include controller node 408 and gateway node 410. Processing node 600 can also be an adjunct or component of a network element, such as an element of access nodes 104, 106, 204, 404, 406, 704, 706, 708, or 710. Processing node 800 can also be another network element in a communication system. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for adjusting a sleep schedule of a wireless device in a wireless network, the method comprising:
    determining that a mobility of the wireless device exceeds a threshold mobility, wherein determining the mobility of the wireless device is based on a number of handover requests over a time period;
    determining by a source access node that the wireless device is operating in a first sleep mode having a first discontinuous reception schedule with first reception intervals separated by first sleep periods prior to handover;
    determining application requirements and power conditions of the wireless device;
    performing a handover of the wireless device from the source access node to a target access node;
    determining by the source access node a first timer comprising an amount of time that the wireless device was in the first sleep mode prior to the handover, wherein determining the first timer further comprises subtracting an adjustment factor from the first timer based on the determined application requirements and power conditions of the wireless device;
    providing by the source access node to the target access node information regarding the determined mobility, the determined first timer, and the determined first sleep mode prior to finishing the handover;
    initiating wireless communication between the target access node and the wireless device during a scheduled first reception interval of the first discontinuous reception schedule;
    resuming the first sleep mode in communication with the target access node according to a second discontinuous reception schedule based on the information provided by the source access node regarding the determined mobility and the determined first sleep mode of the wireless device; and
    instructing the target access node to adjust the second discontinuous reception schedule based on the determined application requirements and power conditions.

2. The method of claim 1, further comprising:
    transitioning the wireless device to a second sleep mode after a first threshold period of inactivity, wherein during the second sleep mode, each reception interval is separated from each adjacent reception interval by a longer sleep period than the sleep periods used to separate reception intervals of the first sleep mode; and
    providing information regarding determined mobility upon resumed communication with the target access node and the second sleep mode prior to handover to another target access node.

3. The method of claim 1, wherein determining the mobility of the wireless device is further based on a number of successful handovers performed over the time period.

4. The method of claim 1, wherein adjusting the second discontinuous reception schedule further comprises
    adjusting by the target access node a second timer, wherein the second timer comprises the first timer in addition to an amount of time that the wireless device has been in the first sleep mode after the handover.

5. The method of claim 4, wherein determining the first timer further comprises adding an amount of estimated time required to perform the handover from the source access node to the target access node.

6. The method of claim 5, wherein the amount of estimated time required to perform the handover is based on previous handover events from the source access node to the target access node.

7. The method of claim 1, wherein the adjustment factor is smaller when application requirements indicate an ability to tolerate delays.

8. The method of claim 1, wherein the adjustment factor is larger when the power conditions indicate that the wireless device has a battery level above a threshold power level or that the wireless device is connected to an external power supply.

9. A system for adjusting a sleep schedule of a wireless device in a wireless network, the system comprising:
    a source access node in wireless communication with a wireless device; and
    a processor coupled to the source access node, wherein the processor is configured to:
    determine that a mobility of the wireless device exceeds a threshold mobility, wherein determining the mobility of the wireless device is based on a number of handover requests over a time period;
    determine that the wireless device is operating in a first sleep mode having a first discontinuous reception schedule prior to handover;
    determine application requirements and power conditions of the wireless device;
    perform a handover of the wireless device to a target access node;
    determine a first timer comprising an amount of time that the wireless device was in the first sleep mode prior to the handover, wherein determining the first timer further comprises subtracting an adjustment factor from the first timer based on the determined application requirements and power conditions of the wireless device; and
    provide to the target access node information regarding the determined mobility, the determined first timer, and the determined first sleep mode prior to finishing the handover;
    and the target access node is configured to:
    initiate wireless communication with the wireless device during a scheduled reception interval of the first discontinuous reception schedule;
    resume the first sleep mode in further communication between the target access node and the wireless device using a second discontinuous reception schedule based on the information provided by the source access node regarding the determined mobility and the determined first sleep mode of the wireless device; and
    adjust the second discontinuous reception schedule based on the determined application requirements and power conditions.

10. The system of claim 9, wherein the target access node is further configured to:
- transition the wireless device to a second sleep mode after a first threshold period of inactivity, wherein during the second sleep mode, each reception interval is separated from each adjacent reception interval by a longer sleep period than the sleep periods used to separate reception intervals of the first sleep mode; and
- provide information regarding determined mobility to a second target access node.

11. The system of claim 9, wherein the processor is further configured to determine the mobility of the wireless device based on a number of successful handovers performed over the time period.

12. The system of claim 9,
wherein the target access node is further configured to:
adjust a second timer, wherein the second timer comprises the first timer in addition to an amount of time that the wireless device has been in the first sleep mode after handover.

13. The system of claim 12, wherein the first timer further comprises an amount of estimated time required to perform the handover from the source access node to the target access node.

14. The system of claim 13, wherein the amount of estimated time required to perform the handover is based on previous handover events from the source access node to the target access node.

15. The system of claim 9, wherein the adjustment factor is smaller when application requirements indicate an ability to tolerate delays.

16. The system of claim 9, wherein the adjustment factor is larger when the power conditions indicate that the wireless device has a battery level above a threshold power level or that the wireless device is connected to an external power supply.

* * * * *